United States Patent
Kim et al.

(10) Patent No.: US 12,469,229 B2
(45) Date of Patent: Nov. 11, 2025

(54) ELECTRONIC DEVICE PROVIDING AUGMENTED REALITY AND OPERATING METHOD THEREOF

(71) Applicant: Samsung Electronics Co., Ltd., Suwon-si (KR)

(72) Inventors: Jeoungju Kim, Suwon-si (KR); Hyunwoo Kim, Suwon-si (KR); Chanmin Park, Suwon-si (KR); Sangwon Chae, Suwon-si (KR); Sunpil Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 18/151,683

(22) Filed: Jan. 9, 2023

(65) Prior Publication Data

US 2023/0222746 A1   Jul. 13, 2023

Related U.S. Application Data

(63) Continuation of application No. PCT/KR2022/021170, filed on Dec. 23, 2022.

(30) Foreign Application Priority Data

Jan. 7, 2022  (KR) .......... 10-2022-0002844
Mar. 17, 2022 (KR) .......... 10-2022-0033209

(51) Int. Cl.
*G06T 19/00*    (2011.01)
*G06F 3/01*     (2006.01)
(Continued)

(52) U.S. Cl.
CPC ............ *G06T 19/006* (2013.01); *G06F 3/017* (2013.01); *G06F 3/14* (2013.01); *G06F 16/9562* (2019.01);
(Continued)

(58) Field of Classification Search
CPC ......... G06T 19/006; G06T 7/11; G06T 19/20; G06T 19/00; G06F 3/017; G06F 3/14;
(Continued)

(56) References Cited

U.S. PATENT DOCUMENTS 9,996,308 B2    6/2018  Park et al.
10,010,379 B1*  7/2018  Gibby ................. A61B 5/1072
(Continued)

FOREIGN PATENT DOCUMENTS

CN   111460070 A      7/2020
JP   2020-509522 A    3/2020
(Continued)

OTHER PUBLICATIONS

International Search Report dated Apr. 5, 2023, issued in International Patent Application No. PCT/KR2022/021170.
(Continued)

*Primary Examiner* — Ryan R Yang
(74) *Attorney, Agent, or Firm* — Jefferson IP Law, LLP

(57) ABSTRACT

An electronic device is provided. The electronic device includes a display, a camera, a memory, and at least one processor operatively connected to the display, the camera, and the memory, and based on an image obtained via the camera, the at least one processor may display, in the display, an augmented reality scene including at least one bookmarking object, may receive a user input for the augmented reality scene, and in response to the user input, store bookmarking data including at least one of information associated with the augmented reality scene or information associated with the at least one bookmarking object in the memory.

18 Claims, 12 Drawing Sheets

(51) Int. Cl.
*G06F 3/14* (2006.01)
*G06F 16/955* (2019.01)
*G10L 15/08* (2006.01)

(52) U.S. Cl.
CPC ........ *G10L 15/08* (2013.01); *G10L 2015/088* (2013.01)

(58) Field of Classification Search
CPC ........ G06F 16/9562; G06F 3/01; G06F 16/53; G06F 3/147; G06F 3/011; G06F 3/013; G06F 3/04842; G06F 3/1462; G06F 16/955; G10L 15/08; G10L 2015/088; G09G 5/14
See application file for complete search history.

(56) References Cited

U.S. PATENT DOCUMENTS

| | | | |
|---|---|---|---|
| 10,133,342 | B2 | 11/2018 | Mittal et al. |
| 10,356,387 | B1 | 7/2019 | Phillips et al. |
| 10,509,533 | B2 | 12/2019 | Grasset et al. |
| 10,911,720 | B2 | 2/2021 | Antunes et al. |
| 2012/0188396 | A1 | 7/2012 | Kim |
| 2015/0116358 | A1* | 4/2015 | Choi ................ G06T 19/006 345/633 |
| 2015/0206349 | A1 | 7/2015 | Rosenthal et al. |
| 2015/0295959 | A1 | 10/2015 | Lee et al. |
| 2016/0055378 | A1* | 2/2016 | Anderson ............ G06F 3/017 345/589 |
| 2018/0260492 | A1 | 9/2018 | Rokos |
| 2020/0168119 | A1* | 5/2020 | Ramani .................. G09B 7/00 |
| 2021/0019946 | A1* | 1/2021 | Sonasath ................ G06T 7/33 |
| 2021/0110610 | A1* | 4/2021 | Xu ........................ G06V 20/20 |
| 2021/0329121 | A1 | 10/2021 | Spivack et al. |
| 2022/0101638 | A1 | 3/2022 | Bae et al. |
| 2022/0283327 | A1* | 9/2022 | Mueller ................ G01C 11/06 |

FOREIGN PATENT DOCUMENTS

| | | | | |
|---|---|---|---|---|
| KR | 10-2012-0085474 | A1 | | 8/2012 |
| KR | 10-2015-0116871 | A | | 10/2015 |
| KR | 10-2016-0010475 | A | | 1/2016 |
| KR | 10-2017-0051013 | A | | 5/2017 |
| KR | 10-2017-0084443 | A | | 7/2017 |
| KR | 10-20210025769 | A | | 3/2021 |
| KR | 20210045702 | A * | 4/2021 | ........... G06F 16/958 |
| KR | 10-2021-0076844 | A | | 6/2021 |
| WO | 2018/204094 | A1 | | 11/2018 |
| WO | 2020/149689 | A1 | | 7/2020 |

OTHER PUBLICATIONS

Extended European Search Report dated Jan. 28, 2025, issued in a European Application No. 22919076.4.

* cited by examiner

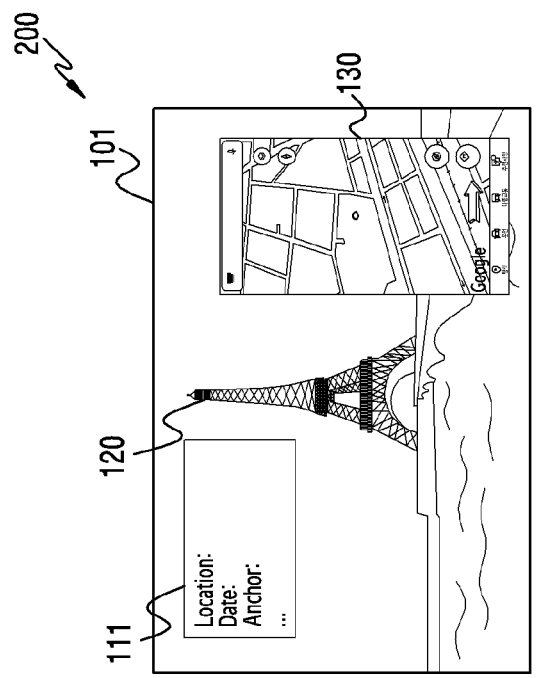
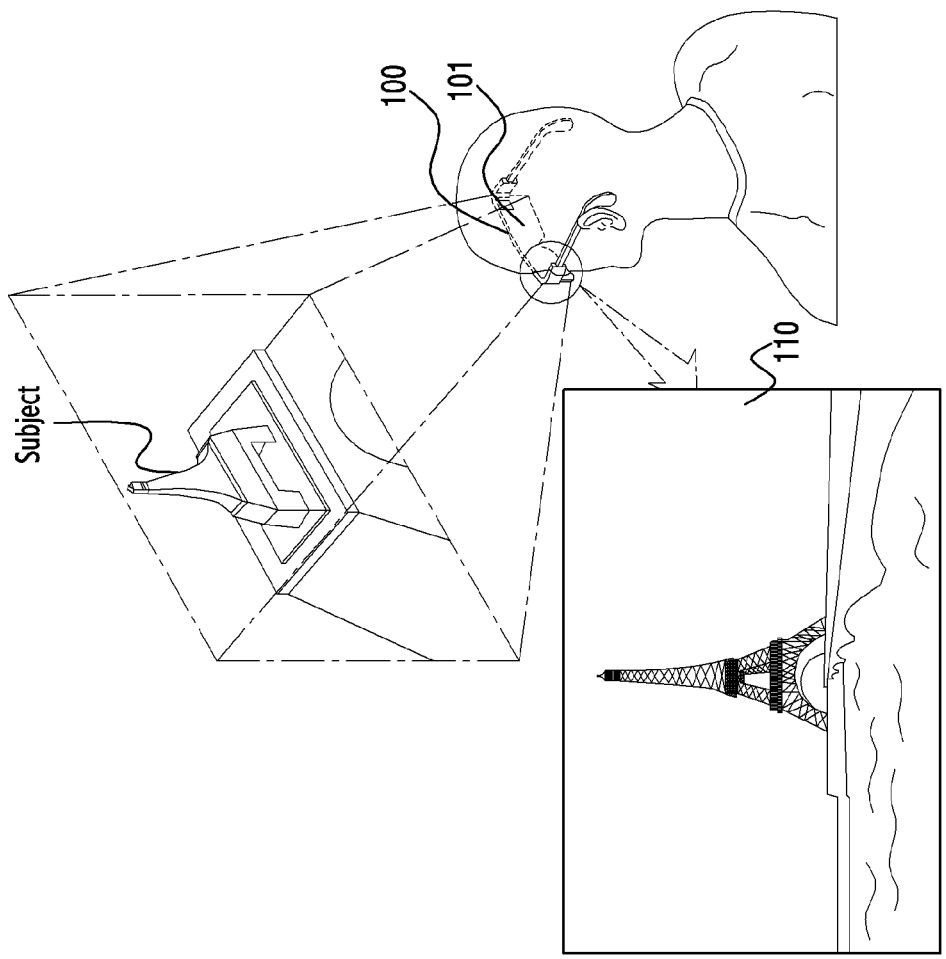
FIG.1A
FIG.1B

ELECTRONIC DEVICE PROVIDING AUGMENTED REALITY AND OPERATING METHOD THEREOF

CROSS-REFERENCE TO RELATED APPLICATION(S)

This application is a continuation application, claiming priority under § 365(c), of an International application No. PCT/KR2022/21170, filed on Dec. 23, 2022, which is based on and claims the benefit of a Korean patent application number 10-2022-0002844, filed on Jan. 7, 2022, in the Korean Intellectual Property Office, and of a Korean patent application number 10-2022-0033209, filed on Mar. 17, 2022, in the Korean Intellectual Property Office, the disclosure of each of which is incorporated by reference herein in its entirety

TECHNICAL FIELD

The disclosure relates to an electronic device that provides an augmented reality and an operation method thereof.

BACKGROUND ART

Augmented reality is technology that projects a virtual image onto a physical space or a real word object in the real world, so as to show a single image. Augmented reality shows an image by superimposing a virtual image on a real world space, and may be utilized to provide information associated with a virtual image and an object in the real word space.

Bookmarking may include a function of easily accessing a webpage that has been visited during a predetermined period of time. An electronic device may store information associated with a bookmarking object (e.g., a webpage or an execution screen of an application). The electronic device may display a bookmarking object that a user has bookmarked, or a list of bookmarking objects. Therefore, the user may easily access a bookmarked webpage again.

The above information is presented as background information only to assist with an understanding of the disclosure. No determination has been made, and no assertion is made, as to whether any of the above might be applicable as prior art with regard to the disclosure.

DISCLOSURE

Technical Problem

An augmented reality scene may include the image of an augmented reality scene and information (or data) related to the augmented reality scene. In the case that the augmented reality scene is bookmarked in the form of an image, information related to the augmented reality scene may not be wholly bookmarked. Therefore, it may be difficult for a user to easily search for and access a bookmarked augmented reality scene.

In addition, in the case that an augmented reality scene includes information that the user does not desire, the augmented reality scene may be bookmarked including information that the user does not desire in addition to information that a user desires.

Aspects of the disclosure are to address at least the above-mentioned problems and/or disadvantages and to provide at least the advantages described below. Accordingly, an aspect of the disclosure is to provide an electronic device that performs a function that bookmarks an augmented reality scene in a manner of wholly including the image of an augmented reality scene and information related to the augmented reality scene, and an operation method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, a camera, a memory, and at least one processor operatively connected to the display, the camera, and the memory, and the at least one processor may be configured to display, in the display, an augmented reality scene including at least one bookmarking object based on an image obtained via the camera, to receive a user input to the augmented reality scene, and in response to the user input, to store, in the memory, bookmarking data including at least one of information associated with the augmented reality scene or information associated with the at least one bookmarking object.

In accordance with another aspect of the disclosure, an operation method of an electronic device is provided. The operation method includes an operation of displaying, in a display, an augmented reality scene including at least one bookmarking object based on an image obtained via a camera, and operation of receiving a user input to the augmented reality scene, and, in response to the user input, an operation of storing, in a memory, bookmarking data including at least one of information associated with the augmented reality scene or information associated with the at least one bookmarking object.

Advantageous Effects

An electronic device according to an embodiment disclosed in the document may provide an electronic device that performs a function that bookmarks an augmented reality scene in a manner of wholly including the image of an augmented reality scene and information related to the augmented reality scene, and an operation method thereof.

In addition, an electronic device according to an embodiment may provide an electronic device that performs a function that bookmarks an augmented reality scene in a manner of including only information that a user desires, and an operation method thereof.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 1A and 1B are diagrams illustrating an example of displaying an augmented reality scene via a display by an electronic device according to various embodiments of the disclosure;

Throughout the drawings, like reference numerals will be understood to refer to like parts, components, and structures.

MODE FOR INVENTION

Figure 2:
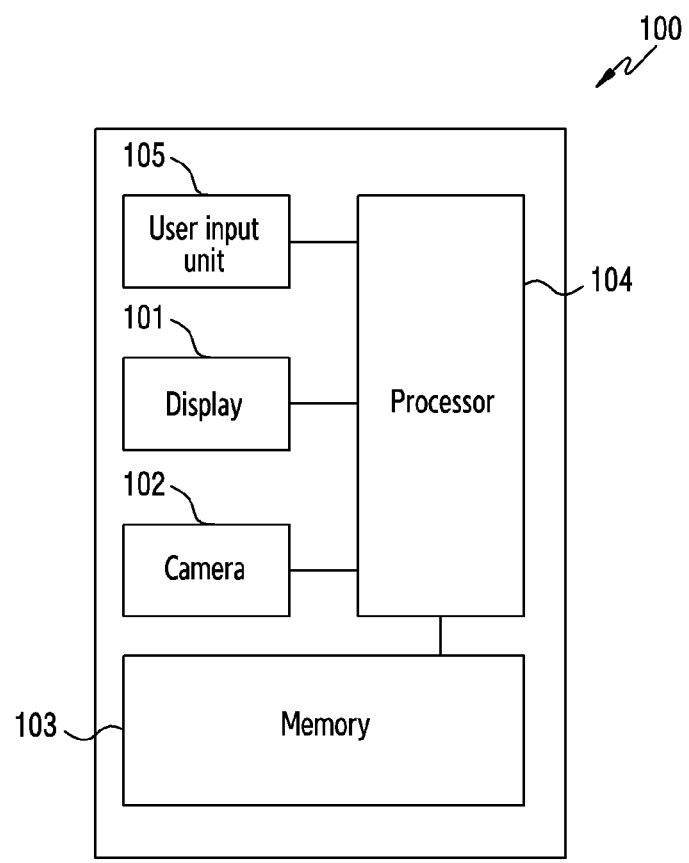
FIG. 2 is a block diagram of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, terms used in the disclosure is merely used for describing a predetermined embodiment, and is not intended to limit the disclosure. In addition, throughout the specification, if it is described that a part is "connected" to another part, this includes the case in which they are "directly connected" and the case in which they are "electrically connected" via another element therebetween. If it is described that a part "comprises" an element, this does not indicate that another element is excluded but another element may be further included, unless otherwise mentioned.

"The" and a demonstrative similar thereto used in the specification, particularly, in claims, may indicate both singular and plural forms. In addition, unless the order of operations that describe the method according to the disclosure is not clearly described, the described operations may be performed in a proper order. The disclosure is not limited to the order of operations stated herein.

In the disclosure, 'augmented reality (AR)' is to show a virtual image together in a physical environment space of the real word or to show a real object (e.g., a subject recognized from an image obtained via a camera) and a virtual image together. An 'augmented reality scene' is a scene that shows a virtual image together in a physical environment space of the real world, or that shows a real object and a virtual object together.

In addition, an 'augmented reality device' (e.g., the electronic device 100 of FIGS. 1A and 1B) is a device that is capable of expressing an 'augmented reality', and may generally include augmented reality glasses provided in the form of glasses that a user wears on his or her face, a head mounted display (HMD) apparatus that a user wears on the his or her head, an augmented reality helmet, and the like. However, an augmented reality device is not limited thereto. For example, the augmented reality device may include a portable communication device (e.g., a smartphone), a computer device, a portable multimedia device, a portable medical device, a camera, a wearable device, or electronic appliance that shoots an image using a camera and displays a screen in which an augmented reality object overlaps the shot image.

A 'real scene' is a scene of the real world that a user views via an augmented reality device, and may include a real world object. In addition, a 'virtual image' is an image produced via an optical engine and may include both a static image and a dynamic image. The virtual image is observed together with a real scene, and may be an image showing information associated with a real object in a real scene, or information associated with the operation of an augmented reality device, a control menu, and the like.

Therefore, a general augmented reality device (e.g., an electronic device 100) may include an optical engine for producing a virtual image, which is constituted by light generated from a light source, and a light guide panel (wave guide) that is formed of a transparent material so as to guide the virtual image produced by the optical engine to the eyes of a user, and to enable the user to see a real word scene together. As described above, the augmented reality device may also need to observe a real world scene. In order to guide light generated from the optical engine to the eyes of a user using the light guide panel, an optical element to change the path of light that basically has straightness may be needed. In this instance, the path of light may be changed using reflection by a mirror and the like, or may be changed via diffraction by a diffraction element such as a diffractive optical element (DOE), a holographic optical element (HOE), and the like. However, the disclosure is not limited thereto.

Hereinafter, the disclosure will be described in detail with reference to attached drawings.

FIGS. 1A and 1B are diagrams illustrating an example in which an electronic device 100 displays an augmented reality scene 200 via a display 101 according to various embodiment of the disclosure.

Referring to FIGS. 1A and 1B, the electronic device 100 may shoot the surrounding area of the electronic device 100 via a camera (not illustrated). The electronic device 100 may obtain the image of the surrounding area of the electronic device 100. FIG. 1A may be an image 110 obtained by shooting a subject via the camera of the electronic device 100. According to an embodiment, the image 110 obtained via the camera may include a real scene that a user views via the electronic device 100. For example, the image 110 obtained via the camera may include a physical environment or space of the real world and a real object of the real world. However, the disclosure is not limited thereto.

According to an embodiment, based on the image 110 obtained via the camera, the electronic device 100 may display an augmented reality scene 200 in the display 101. The augmented reality scene 200 may include a scene that shows a virtual image together in a physical environment or space of the real world, or a scene that shows a real object and a virtual object together. FIG. 1B is an augmented reality scene 200 displayed via the display 101.

According to an embodiment, the augmented reality scene 200 may include at least one bookmarking object. Referring to FIG. 1B, at least one bookmarking object may include a subject image 120 recognized from the image 110 obtained via a camera and a virtual image 130. The electronic device 100 may perform an image recognition algorithm associated with an image obtained by shooting a subject so as to recognize an area of the subject shot, and may identify the image in the recognized area as a subject image. However, the disclosure is not limited thereto.

According to an embodiment, the virtual image 130 may be an image produced via an optical engine. The virtual image 130 may include at least one of a static image or a dynamic image. The virtual image 130 may be observed together with a real scene, and may include an image showing information associated with a real object in a real scene, or information associated with the operation of a reality device, a control menu, or the like. For example, referring to FIG. 1B, the virtual image 130 may include an application execution screen. However, the disclosure is not limited thereto. For example, the virtual image 130 may include at least one virtual object such as an animation character.

According to an embodiment, the augmented reality scene 200 may include information related to the augmented reality scene 200. For example, the augmented reality scene 200 may include augmented reality scene-associated information 111 or information associated with at least one bookmarking object (i.e., subject image 120 and virtual image 130) in the augmented reality scene 200.

According to an embodiment, information related to the augmented reality scene 200 may be displayed in the display 101. For example, at least one of the augmented reality scene-associated information 111 or information associated with a bookmarking object may be displayed via the display 101. For example, referring to FIG. 1B, the augmented reality scene-associated information 111 including location information of an augmented reality scene or date information of an augmented reality scene may be displayed via the display 101.

According to an embodiment, the electronic device 100 may include a bookmark function. The electronic device 100 may store, as bookmarking data in memory 103, at least one among the augmented reality scene 200, the augmented reality scene-associated information 111, the bookmarking object (i.e., subject image 120 and virtual image 130), or the information associated with the bookmarking object. The electronic device 100 may store bookmarking data associated with an augmented reality scene, and thus the electronic device 100 may wholly display an augmented reality scene corresponding to bookmarking data of when the bookmarking was performed (or when the augmented reality scene was captured), to a user when the user desires. In the disclosure, 'wholly' indicates the state in which loss of bookmarking data associated with an augmented reality scene is not present.

Although FIGS. 1A and 1B illustrate the electronic device 100 provided in the form of a head mounted display apparatus, the form of the electronic device 100 is not limited thereto. For example, the electronic device may include a portable communication device (e.g., a smartphone), a computer device, a portable multimedia device, a portable medical device, a camera, a wearable device, or electric appliance.

FIG. 2 is a block diagram of an electronic device according to an embodiment of the disclosure.

Referring to FIG. 2, the electronic device 100 may include the display 101, a camera 102, a memory 103, a user input unit 105, and a processor 104 that is electrically or operatively connected to the display 101, the camera 102, the memory 103 and the user input unit 105. However, the elements of the electronic device 100 are not limited thereto. The electronic device 100 may omit at least one element among the above-described elements, or may further include at least one element. For example, the electronic device 100 may further include a communication interface (not illustrated). The communication interface may perform, with an external device (not illustrated) and a server (not illustrated), transmission or reception of data for receiving a service based on the image 110 of FIGS. 1A and 1B obtained by shooting a surrounding area of the electronic device 100 or the augmented reality scene 200 of FIGS. 1A and 1B.

According to an embodiment, the display 101 may output information processed in an augmented reality device (e.g., the electronic device 100). For example, the display 101 may display information related to a service provided based on an augmented scene or an image obtained by shooting the surrounding area of the electronic device 100 and a user interface for shooting a surrounding area of the electronic device 100. For example, the display 101 may display an augmented reality scene including at least one bookmarking object.

According to an embodiment, the display 101 may provide an augmented reality (AR) image. The display 101 according to an embodiment may include a light guide panel and an optical engine. The light guide panel may be formed of a transparent material of which a part of the rear side is shown when a user puts on the electronic device 100. When the light guide panel may be provided in a single flat panel structure or multi-flat panel structure made of a transparent material in which light is reflected inside the light guide panel and is propagated. The light guide panel is disposed to face an exit surface of the optical engine, and may receive input of light of a virtual image projected from the optical engine. The transparent material may be a material through which light passes. The degree of transparency may not be 100%, and may include a predetermined color. According to an embodiment, the light guide panel is formed of a transparent material and thus a user is capable of viewing a virtual object in the virtual image via the display 101, and is also capable of viewing a real outside scene. Accordingly, the light guide panel may be referred to as a see through display. The display 101 may output the virtual object of the virtual image via the light guide panel, and may provide an augmented reality image. In the case that the electronic device 100 is a device in the form of glasses, the display 101 may include a left-side display unit and a right-side display unit. However, the disclosure is not limited thereto. For example, the display unit may include a touch screen.

According to an embodiment, the camera 102 may shoot a surrounding area of the electronic device 100. In the case that an application that requires a shooting function is executed, the camera 102 may obtain an image frame such as a static image, a video, or the like via an image sensor. An image captured via the image sensor may be processed via the processor 104 to be described later or a separate image processing unit (not illustrated).

According to an embodiment, the memory 103 may store a program to be executed by the processor 104 to be described, and may store data input to the electronic device 100 or output from the electronic device 100. For example, the memory 103 may store bookmarking data including at least one of information associated with the augmented reality scene or information associated with at least one bookmarking object.

The memory 103 may include at least one type of storage medium among a flash memory type, a hard disk type, a multimedia card micro type, a card-type memory (e.g., an SD, an XD memory, or the like), random access memory (RAM) static random access memory (SRAM), read-only memory (ROM), electrically erasable programmable read-only memory (EEPROM), programmable read-only memory (PROM), magnetic memory, magnetic disc, and an optical disc. However, the disclosure is not limited thereto.

According to an embodiment, the user input unit 105 may be a device that a user uses to input data for controlling an augmented reality device (e.g., the electronic device 100). For example, the user input unit 105 may include at least one from among a key pad, a dome switch, a touch pad (touch-based capacitive scheme, pressure-based resistive scheme, an infrared sensing scheme, a surface acoustic wave conduction scheme, an integral tension layering scheme, Piezo effect scheme, and the like), a jog wheel, or a jog switch. However, the disclosure is not limited thereto.

According to an embodiment, the user input unit 105 may shoot a surrounding area of the electronic device 100 using the camera 102, and may receive a user input for receiving a service from the electronic device 100 or a server (not illustrated) based on the image shot.

According to an embodiment, the processor 104 may control the overall operation of the electronic device 100. For example, the processor 104 may execute programs stored in the memory 103, and may generally control the display 101, the camera 102, the user input unit 105, and the like.

According to an embodiment, the processor 104 may be electrically or operatively connected to the display 101 and the camera 102. The processor 104 may control the display 101 to display an augmented reality scene based on an image obtained via the camera 102.

According to an embodiment, the processor 104 may be electrically or operatively connected to the user input unit 105. The processor 104 may receive a user input to the augmented reality scene displayed in the display 101. For example, the processor 104 may receive a user input for capturing the augmented reality scene displayed in the display 101.

According to an embodiment, the processor 104 may be electrically or operatively connected to memory 103. In response to the user input, the processor 104 may store, in the memory 103, bookmarking data including at least one of information associated with the augmented reality scene or information associated with at least one bookmarking object.

Figure 3:
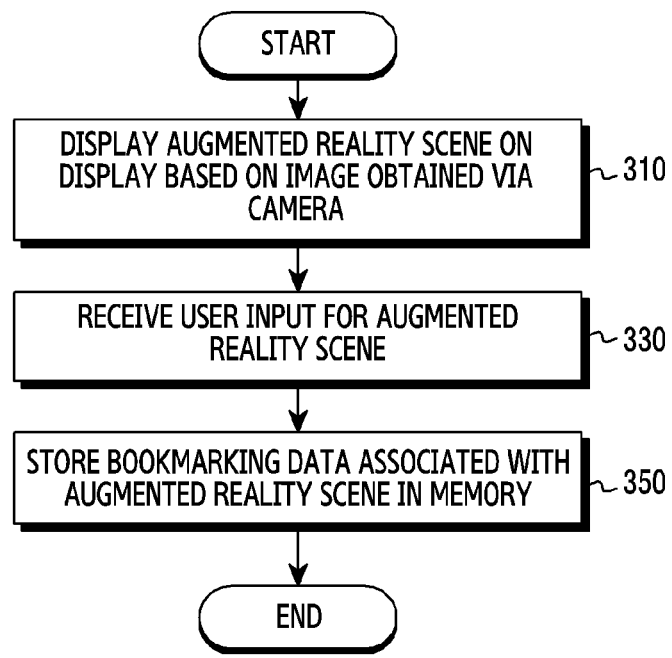
FIG. 3 is a flowchart illustrating an operation method of bookmarking an augmented reality scene by an electronic device according to an embodiment of the disclosure.

FIG. 3 is a flowchart illustrating an operation method 300 of bookmarking an augmented reality scene by an electronic device according to an embodiment of the disclosure.

Referring to FIG. 3, the operation method 300 of the electronic device may include operation 310 of displaying, based on an image obtained via a camera, an augmented reality scene in a display, operation 330 of receiving a user input to the augmented reality scene, and operation 350 of storing bookmarking data associated with the augmented reality scene in a memory. However, the operation method 300 of the electronic device is not limited thereto. The operation method 300 of the electronic device may omit at least one operation among the above-mentioned operations, or may further include at least one operation. For example, the operation method 300 of the electronic device may further include an operation of searching for bookmarking data corresponding to a user input or an operation of sharing bookmarking data. The operation of searching for bookmarking data corresponding to a user input may be described with reference to FIG. 8. The operation of sharing bookmarking data may be described with reference to FIGS. 10 and 11.

According to an embodiment, in operation 310, the processor 104 of the electronic device 100 may obtain an image via the camera 102. The processor 104 may control the display 101 to display an augmented reality scene based on an image obtained via the camera 102. Therefore, a user may view the augmented reality scene via the display 101. The augmented reality scene may include at least one bookmarking object. For example, the augmented reality scene may include at least one of a subject image or a virtual image recognized from an image obtained via the camera 102. According to an embodiment, the virtual image may include at least one of a virtual object or an application execution screen. However, the disclosure is not limited thereto.

According to an embodiment, in operation 330, the processor 104 of the electronic device 100 may receive a user input to the augmented reality scene. For example, the processor 104 may receive a user input that commands capturing the augmented reality scene. The processor 104 may receive a user input that commands capturing the entirety or a part of the augmented reality scene. However, the disclosure is not limited thereto.

According to an embodiment, in operation 350, the processor 104 of the electronic device 100 may store bookmarking data in the memory 103 in response to a user input. For example, the processor 104 may store bookmarking data in the memory 103 in response to a user input for bookmarking the augmented reality scene. However, the disclosure is not limited thereto. For example, the processor 104 may store the bookmarking data in at least one server (not illustrated) or in at least one external electronic device (not illustrated).

According to an embodiment, the bookmarking data may include information associated with the augmented reality scene or information associated with at least one bookmarking object. However, the disclosure is not limited thereto. For example, the bookmarking data may include at least one of augmented reality segment information indicating an area of the bookmarking object in the augmented reality scene or an image obtained by capturing the augmented reality scene. Therefore, the processor 104 may store bookmarking data for easy access to a captured augmented reality scene.

According to an embodiment, the processor 104 may control the display 101 to display an augmented reality scene corresponding to the bookmarking data stored in operation 350. Therefore, the electronic device 100 may wholly provide, to a user, the augmented reality scene corresponding to the stored bookmarking data.

Figure 4:
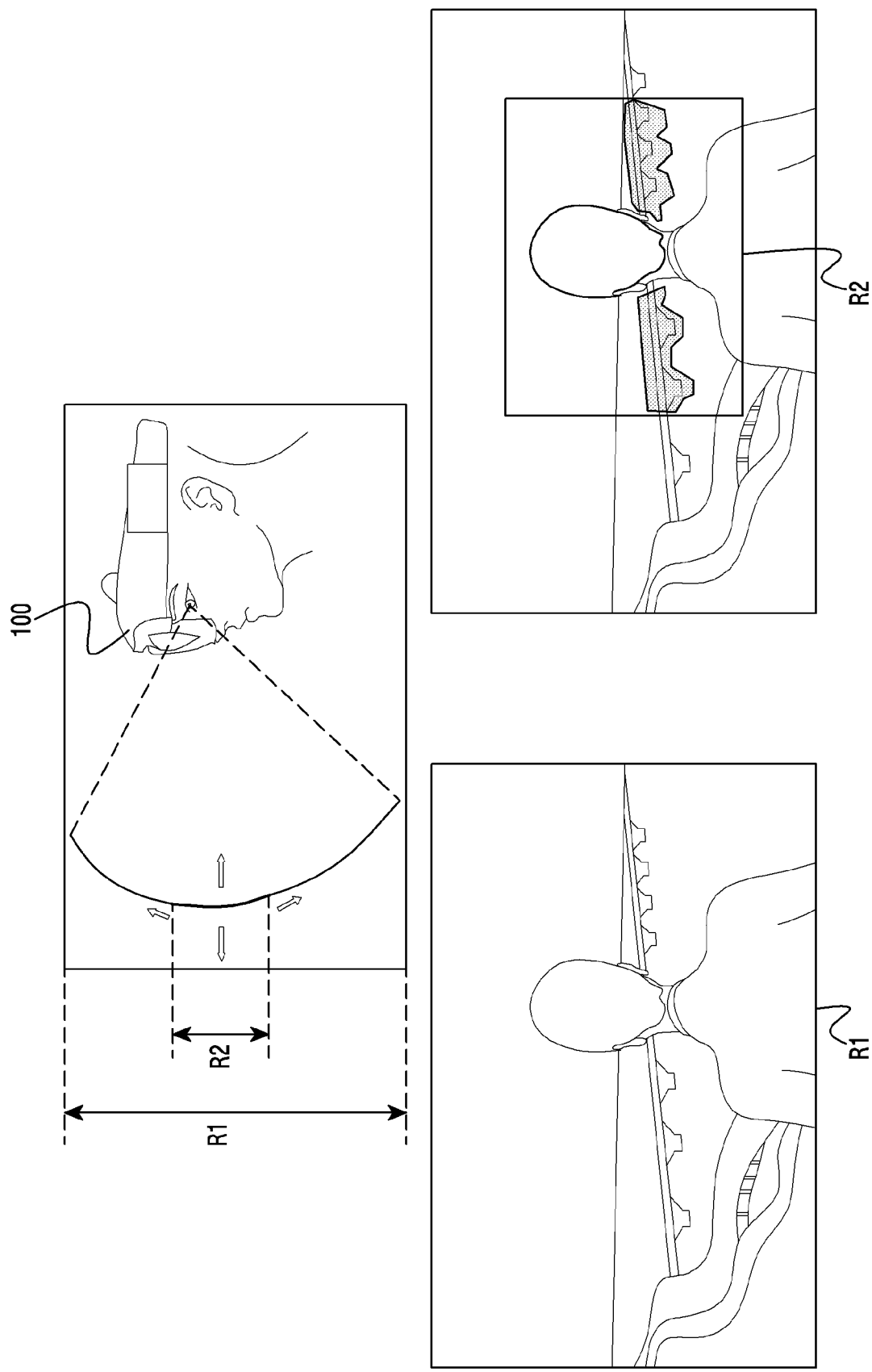
FIG. 4 is a diagram illustrating an example of selecting an area of an augmented reality scene of an electronic device and capturing a selected area by an electronic device according to an embodiment of the disclosure.

FIG. 4 is a diagram illustrating an example of selecting an area of an augmented reality scene of an electronic device, and capturing the selected area by an electronic device according to an embodiment of the disclosure.

Descriptions of the electronic device 100 of FIG. 4 and elements thereof (e.g., a display, a camera) may make reference to the electronic device 100 of FIGS. 1A, 1B, 2, and 3 and the elements thereof (e.g., the display 101, the camera 102). The same terms or the same reference numerals are used for the elements that are the same or substantially the same as the above descriptions, and duplicated descriptions will be omitted.

Referring to FIG. 4, a user may view an augmented reality scene via the electronic device 100. For example, based on an image obtained via a camera, the user may view an augmented reality scene including at least one bookmarking object via the display 101. According to an embodiment, a first area (R1) of FIG. 4 may be the entire area of the augmented reality scene that the user views via the display 101 or the entire image obtained via a camera.

According to an embodiment, the processor 104 of the electronic device 100 may determine at least one of the location or the line of sight of the user of the electronic device 100. The processor 104 may determine an augmented reality scene based on at least one of the location and the line of sight.

According to an embodiment, the processor 104 may receive a user input that selects (or determines) an area to be bookmarked in the augmented reality scene. For example, the processor 104 may receive a user input to select the size or the location of an area to be bookmarked in the augmented reality scene. The processor 104 may select a partial area in the augmented reality scene viewed from user's field of vision in the line of sight of the user (e.g., AR glasses or head mounted display (HMD) apparatus) in response to the user input. For example, referring to FIG. 4, the processor 104 may select a second area (R2) that is a partial area to be bookmarked in the first area (R1). However, the disclosure is not limited thereto. According to an embodiment, the processor 104 may select the entire area (e.g., the first area (R1)) of an augmented reality scene viewed from the user's field of vision. According to an embodiment, the processor 104 may receive a touch input that selects the second area (R2) via a touch screen.

According to an embodiment, the processor 104 of the electronic device 100 may determine a capture area in response to the user input for selecting an area to be bookmarked. For example, based on the user input, the processor 104 may determine a capture area including at least one bookmarking object in the augmented reality scene. Referring to FIG. 4, the processor 104 may determine the first area (R1) as a capture area in response to a user input for selecting the first area (R1). In an example, the processor 104 may determine the second area (R2) as a capture area in response to a user input for selecting the second area (R2). Based on the determined capture area, the processor 104 may determine at least one bookmarking object included in the bookmarking data.

Figure 5:
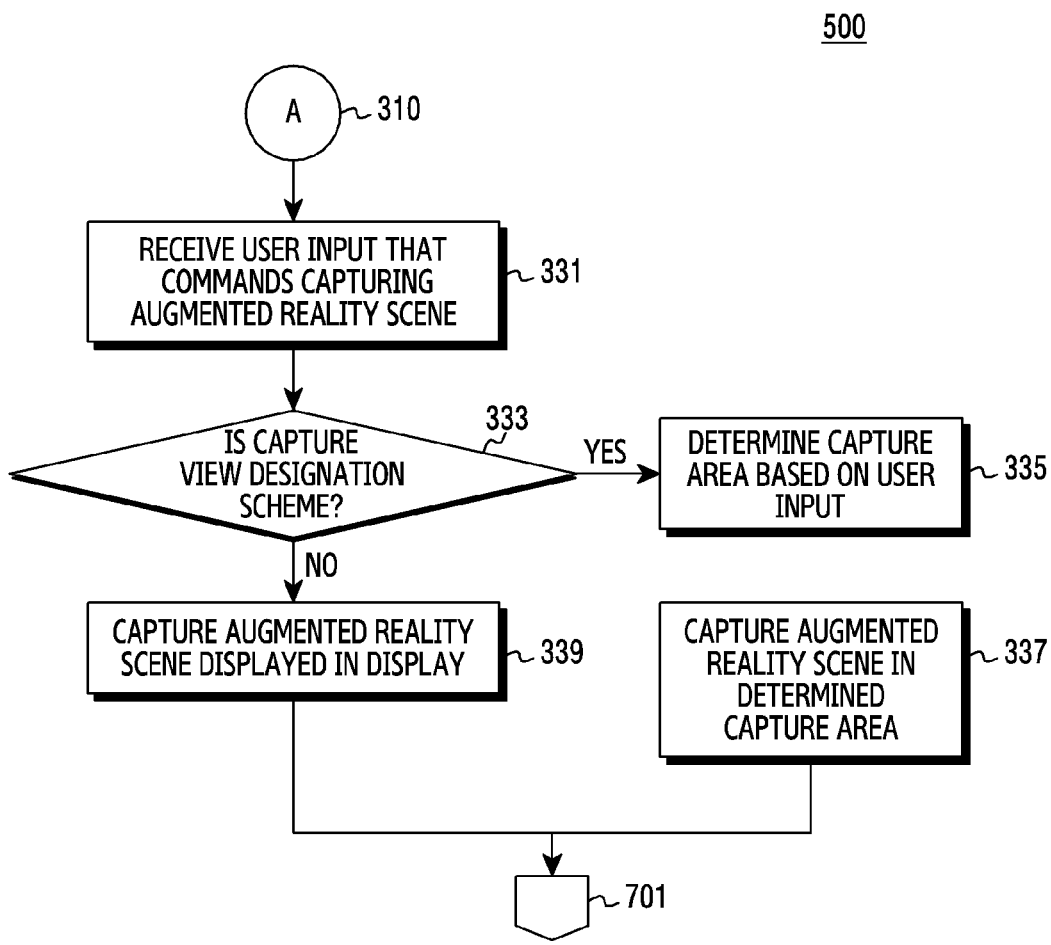
FIG. 5 is a flowchart illustrating an operation method of capturing an area of an augmented reality scene by an electronic device according to an embodiment of the disclosure.

FIG. 5 is a flowchart illustrating an operation method of capturing an area of an augmented reality scene by an electronic device according to an embodiment of the disclosure.

The descriptions of the electronic device 100 of FIG. 5 and the elements thereof may make reference to the electronic device 100 of FIGS. 1A, 1B, 2, 3, and 4 and the elements thereof (e.g., the display 101). The description of the operation method 500 of FIG. 5 may make reference to the operation method 300 of FIG. 3. For example, the operation method 500 of FIG. 5 may be included in operation 330 of receiving a user input to an augmented reality scene as illustrated in FIG. 3. However, the disclosure is not limited thereto.

The same terms or the same reference numerals are used for the elements that are the same or substantially the same as the above description, and duplicated descriptions will be omitted.

According to an embodiment, in operation 331, the processor 104 of the electronic device 100 may receive a user input to command capturing an augmented reality scene. According to an embodiment, the user input to command capturing may be a gesture input defined in advance. Alternatively, the user input may be a touch input, for example, a touch & hold input that keeps touching during a predetermined period of time. Alternatively, the user input may be a voice input defined in advance. However, the disclosure is not limited thereto.

According to an embodiment, in operation 333, the processor 104 may determine whether a capture scheme is a capture view designation scheme in response to the user input to command capturing. The capture view designation scheme may be a scheme of designating an area of an augmented reality scene that a user desires to capture.

According to an embodiment, if it is determined that the capture scheme is the capture view designation scheme, the processor 104 may determine a capture area based on a user input in operation 335. For example, referring to FIG. 4, in response to determining the capture scheme as the capture view designation scheme, if the user selects the second area (R2) in the first area (R1) as an area to be bookmarked, the processor 104 may determine the second area (R2) selected by the user as the capture area.

According to an embodiment, in the case that the capture area is determined based on the user input, the processor 104 may proceed with operation 337 of capturing an augmented reality scene in the determined capture area. For example, referring to FIG. 4, in response to determining the capture area as the second area (R2), the processor 104 may perform an operation of capturing the second area (R2) that the user selects in the first area (R1).

According to an embodiment, if it is determined that that the capture scheme is not the capture view designation scheme, the processor 104 may perform operation 339 of capturing the augmented reality scene displayed in the display 101 in response to the user input to command capturing in operation 339. For example, referring to FIG. 4, in response to determining that the capture scheme is not the capture view designation scheme, the processor 104 may perform an operation of capturing the first area (R1) that is the augmented reality scene displayed in the display 101.

According to an embodiment, in response to the user input that commands capturing, the processor 104 may perform a capturing operation, and may store, in the memory 103, bookmarking data associated with the captured augmented reality scene.

Figure 6:
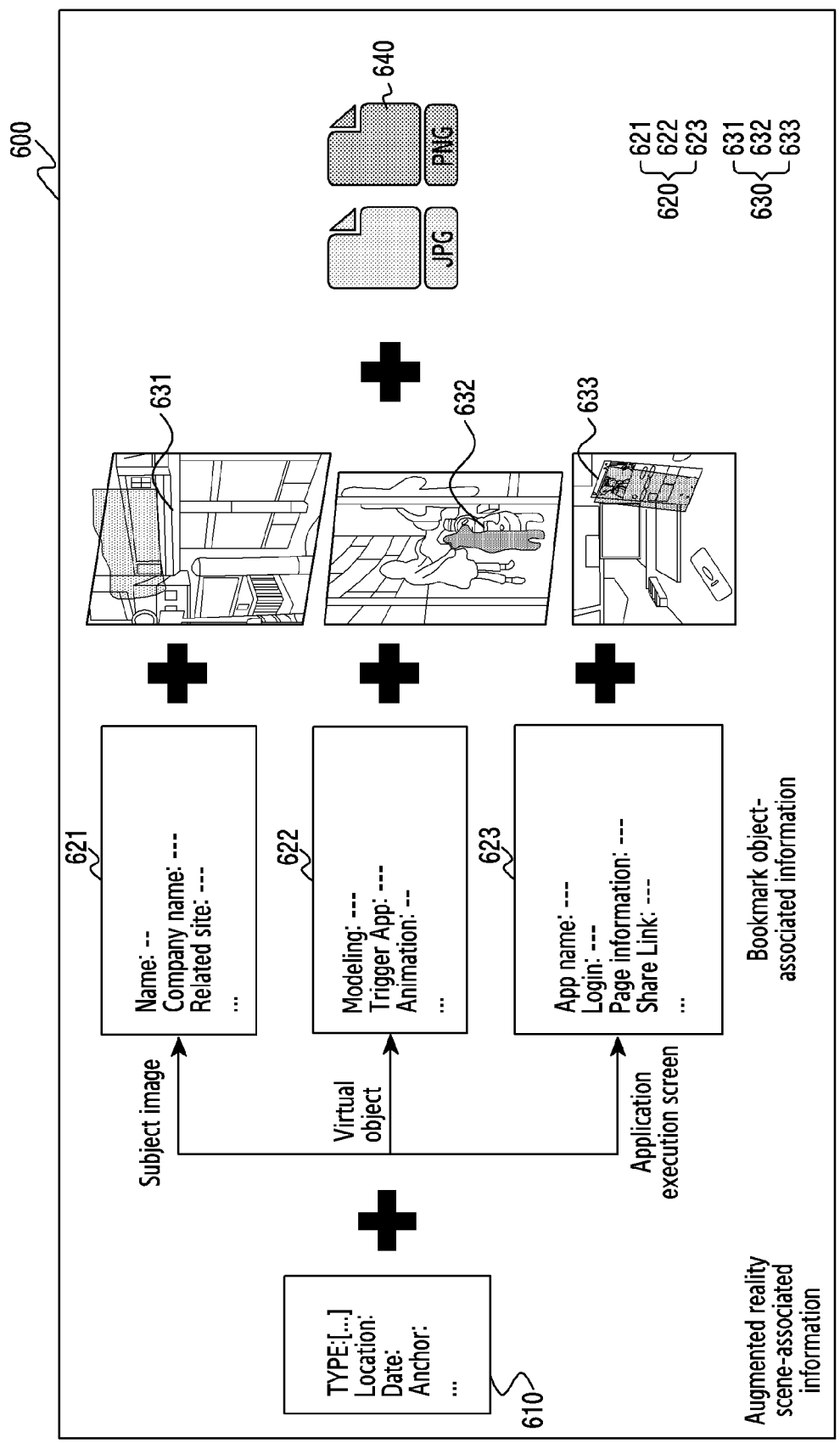
FIG. 6 is a diagram illustrating bookmarking data associated with an augmented reality scene according to an embodiment of the disclosure.

FIG. 6 is a diagram illustrating bookmarking data associated with a captured augmented reality scene according to an embodiment of the disclosure.

The description of bookmarking data 600 and at least one bookmarking object of FIG. 6 may make reference to the bookmarking data and at least one bookmarking object of FIGS. 1A, 1B, 2, 3, 4, and 5. The same terms are used for the elements that are the same or substantially the same as the above description, and duplicated descriptions will be omitted.

An augmented reality scene described in FIG. 6 may be a captured augmented reality scene described in FIG. 5. For example, an augmented reality scene described in FIG. 6 may be the entire augmented reality scene in the case that the entire area of an augmented reality scene displayed via the display 101 is captured, and may be a captured part of the augmented reality scene in the case that a part of the augmented reality scene displayed via the display 101 is captured.

Referring to FIG. 6, the bookmarking data 600 may include augmented reality scene-associated information 610, bookmark object-associated information 620, augmented reality segment information 630 indicating an area of a bookmarking object in an augmented reality scene, and an augmented reality scene-captured image 640. However, the elements of the bookmarking data 600 are not limited thereto. For example, the bookmarking data 600 may omit at least one element among the above-described elements, or may include at least one other element.

The bookmarking data 600 of FIG. 6 is merely an example of bookmarking data when a captured augmented reality scene includes a subject image, a virtual object, and an application execution screen, and the bookmarking data of the disclosure is not limited thereto. For example, the bookmarking data of the disclosure may be bookmarking data associated with an augmented reality scene including at least one of a plurality of subject images, a plurality of virtual object, or a plurality of application execution screens.

In addition, information illustrated in FIG. 6 (e.g., location information, date information, or name information) and the content thereof are merely an example for describing the disclosure, and the disclosure is not limited thereto.

According to an embodiment, a subject image may be a real world object included in a real world scene that a user views via the electronic device 100. However, the disclosure is not limited thereto.

According to an embodiment, a virtual object may overlap an image including a subject image (e.g., an image obtained via a camera). The virtual object may include a static image or a dynamic image as a virtual object produced via an optical engine. For example, the virtual object may be a virtual animation character. According to an embodiment, the virtual object may be displayed in an augmented reality scene in the case that a predetermined application is executed or a predetermined mark is recognized. For example, the virtual object may be displayed in an augmented reality scene in the case when a barcode included in a real world scene is recognized. However, the disclosure is not limited thereto. For example, the virtual object may be displayed in a light guide panel in the case that a user views a subject via the light guide panel.

According to an embodiment, the augmented reality scene-associated information 610 may include information associated with an augmented reality scene itself. For example, the augmented reality scene-associated information 610 may include at least one of type information that classifies a bookmarking object included in an augmented reality scene or basic information associated with an augmented reality scene.

According to an embodiment, the type information may be information associated with the type of a bookmarking object included in an augmented reality scene. For example, the type information may be information associated with the type of a bookmarking object included in an augmented reality scene, or information associated with the number of entitles associated with at least one of a subject image, a virtual object, or an application execution screen in an augmented reality scene. However, the scope of the type information is not limited thereto.

According to an embodiment, the basic information may include at least one among location information, time information, or anchor information associated with an augmented reality scene. However, the basic information is not limited thereto. For example, the basic information may include weather information associate with an augmented reality scene.

According to an embodiment, the bookmarking object-associated information 620 may include type-based information configured based on the type information. For example, the bookmarking object-associated information 620 may include at least one among subject image-associated information 621, virtual object-associated information 622, or application execution screen-associated information 623.

According to an embodiment, the type-based information may be information associated with each type of bookmarking object. For example, referring to FIG. 6, if the type information indicates that the bookmarking object is a virtual object, the type-based information may be the virtual object-associated information 622.

According to an embodiment, in the case that the type information indicates a subject image, the subject image-associated information 621 that is type-based information may include at least one of name information, company name information, or related site information associated with a subject image. In this instance, the subject image-associated information 621 is not limited thereto.

According to an embodiment, in the case that the type information indicates a virtual object, the virtual object-associated information 622 that is type-based information may include trigger information associated with a trigger that calls the virtual object or call information for calling the virtual object. In this instance, the virtual object-associated information 622 is not limited thereto. For example, if the virtual object is a character, the virtual object-associated information 622 may include character name information or related animation information.

According to an embodiment, in the case that type information indicates an application execution screen, the application execution screen-associated information 623 may include the state information of an application for executing an application execution screen. For example, the application execution screen-associated information 623 may include at least one of the name information of an application, information associated with whether logging in an application is performed, or information associated with a page of an application. In this instance, the application execution screen-associated information 623 is not limited thereto. For example, the application execution screen-associated information 623 may include the URL information of when the bookmarking data was stored.

According to an embodiment, the segment information 630 may be information indicating an area of each of at least one bookmarking object in an augmented reality scene. For example, the segment information 630 may be information indicating at least one segmented area corresponding to at least one bookmarking object in an augmented reality scene. However, the disclosure is not limited thereto. According to an embodiment, the segment information 630 may include information associated with a layer located in an area of each of at least one bookmarking object in an augmented reality scene. For example, referring to FIG. 6, subject image-associated segment information 631 may include information associated with a first layer. Virtual object-associated segment information 632 or application execution screen-associated segment information 633 may include information associated with a second layer or a third layer that overlaps the first layer.

According to an embodiment, the segment information 630 may include a different color for each of at least one bookmarking object. For example, the subject image-associated segment information 631 may include yellow, the virtual object-associated segment information 632 may include blue, and the application execution screen-associated segment information 633 may include green. However, the disclosure is not limited thereto. For example, the segment information 630 may be information associated with a binary value corresponding to each of the pixels in an area where each bookmarking object is located in an augmented reality scene.

According to an embodiment, based on the segment information 630, at least one bookmarking object may be excluded from a captured augmented reality scene or from bookmarking data.

Figure 7:
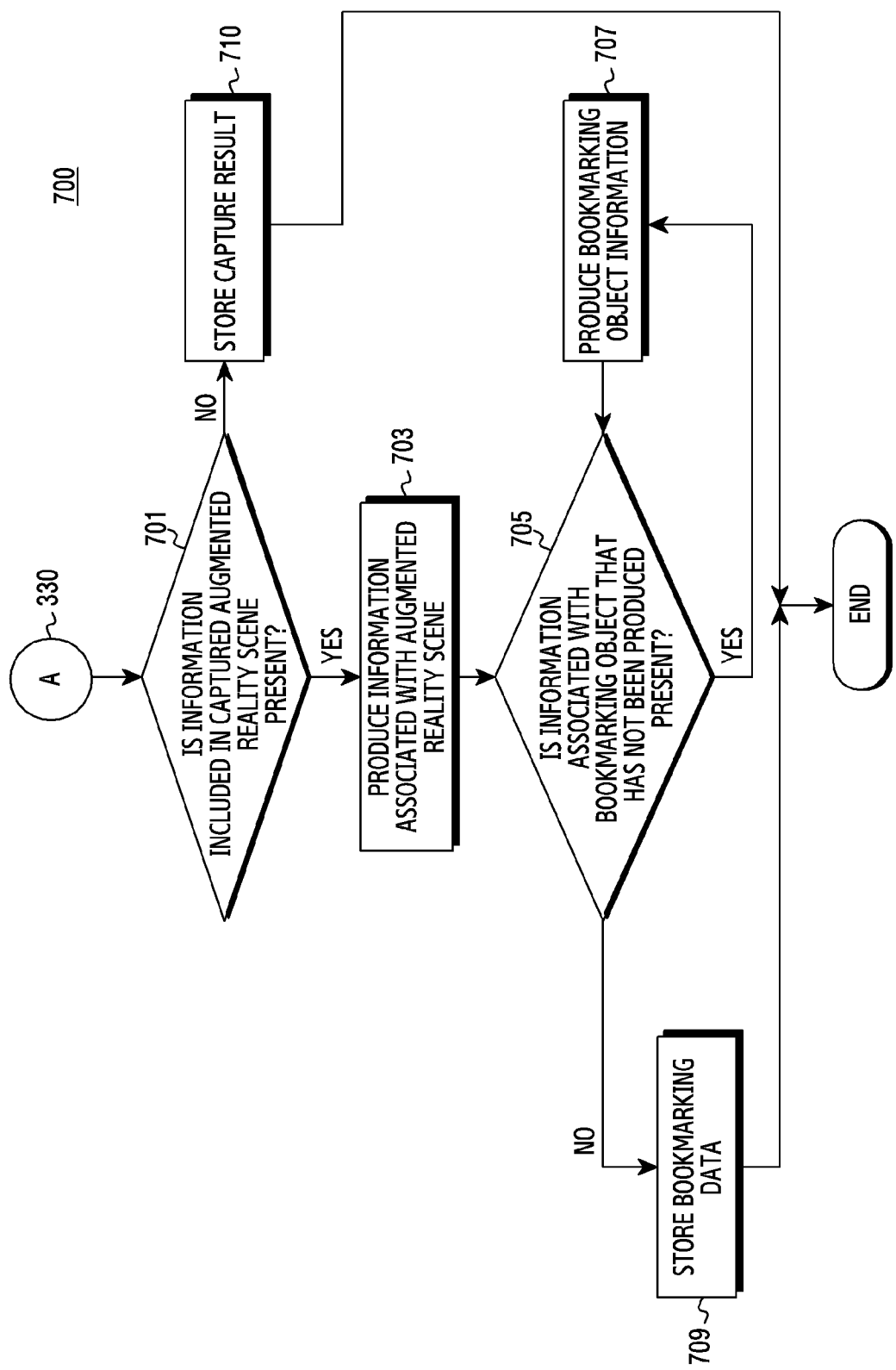
FIG. 7 is a flowchart illustrating an operation method of storing bookmarking data associated with an augmented reality scene according to an embodiment of the disclosure.

FIG. 7 is a flowchart illustrating an operation method of storing bookmarking data associated with an augmented reality scene according to an embodiment of the disclosure.

The descriptions of the electronic device 100 of FIG. 7 and the elements thereof may make reference to the electronic device 100 of FIGS. 1A, 1B, 2, 3, 4, 5, and 6 and the elements thereof.

The description of the operation method 700 of FIG. 7 may make reference to the operation method 300 of FIG. 3. For example, the operation method 700 of FIG. 7 may be included in operation 350 of storing bookmarking data associated with an augmented reality scene of FIG. 3 as illustrated in FIG. 3. However, the disclosure is not limited thereto.

The same terms or the same reference numerals are used for the elements that are the same or substantially the same as the above description, and duplicated descriptions will be omitted.

An augmented reality scene described in FIG. 7 may be a captured augmented reality scene described in FIG. 5. For example, the augmented reality scene described in FIG. 7 may be the entire augmented reality scene in the case that the entire area of an augmented reality scene displayed via the display 101 is captured, and may be a captured part of the captured augmented reality scene in the case that a part of the augmented reality scene displayed via the display 101 is captured.

Referring to FIG. 7, in operation 701, the processor 104 may determine whether information included in the captured augmented reality scene is present. For example, the processor 104 may determine whether at least one of augmented reality scene-associated information or bookmarking object-associated information is present.

According to an embodiment, in operation 703, in response to determining that information included in the captured augmented reality scene is present, the processor 104 may produce augmented reality scene-associated information. For example, in response to determining that information included in the captured augmented reality scene is present, the processor 104 may produce at least one information among type information that classifies a bookmarking object in the captured augmented reality scene or basic information associated the augmented reality scene.

According to an embodiment, in operation 705, the processor 104 may determine whether information associated with a bookmarking object that has not been produced is present in the captured augmented reality scene. For example, the processor 104 may determine whether information associated with at least one of a subject image, a virtual object, or an application execution screen that has not been produced is present in the captured augmented reality scene.

According to an embodiment, in operation 707, in response to determining that information associated with a bookmarking object that has not been produced is present, the processor 104 may produce information associated with at least one bookmarking object included in the captured augmented reality scene. For example, in response to determining that information associated with at least one of a subject image, a virtual object, or an application execution screen, which has not been produced, is present in the captured augmented reality scene, the processor 104 may produce information associated with at least one of a subject image, a virtual object, or an application execution screen in the captured augmented reality scene.

According to an embodiment, in operation 709, in response to determining that information associated with a bookmarking object that has not been produced is not present, the processor 104 may store bookmarking data including at least one of captured augmented reality scene-associated information or bookmarking object-associated information. Therefore, referring to FIG. 6, the stored bookmarking data 600 may include at least one of the captured augmented reality scene-associated information 610 or the bookmarking object-associated information 620. However, the disclosure is not limited thereto. For example, the stored bookmarking data 600 may include at least one of the augmented reality segment information 630 or the augmented reality scene-captured image 640.

According to an embodiment, the stored bookmarking data 600 may be the combination of meta data. For example, the stored bookmarking data 600 may be data obtained by combining at least one of the captured augmented reality scene-associated information 610, the bookmarking object-associated information 620, the segment information 630, or the captured image 640.

According to an embodiment, in operation 710, in response to determining that information included in the captured augmented reality scene is not present, the processor 104 may store a capture result. For example, the processor 104 may store the capture result in the memory 103 in response to determining that augmented reality scene-associated information and bookmarking object-associated information included in the captured augmented reality scene is not present.

Figure 8:
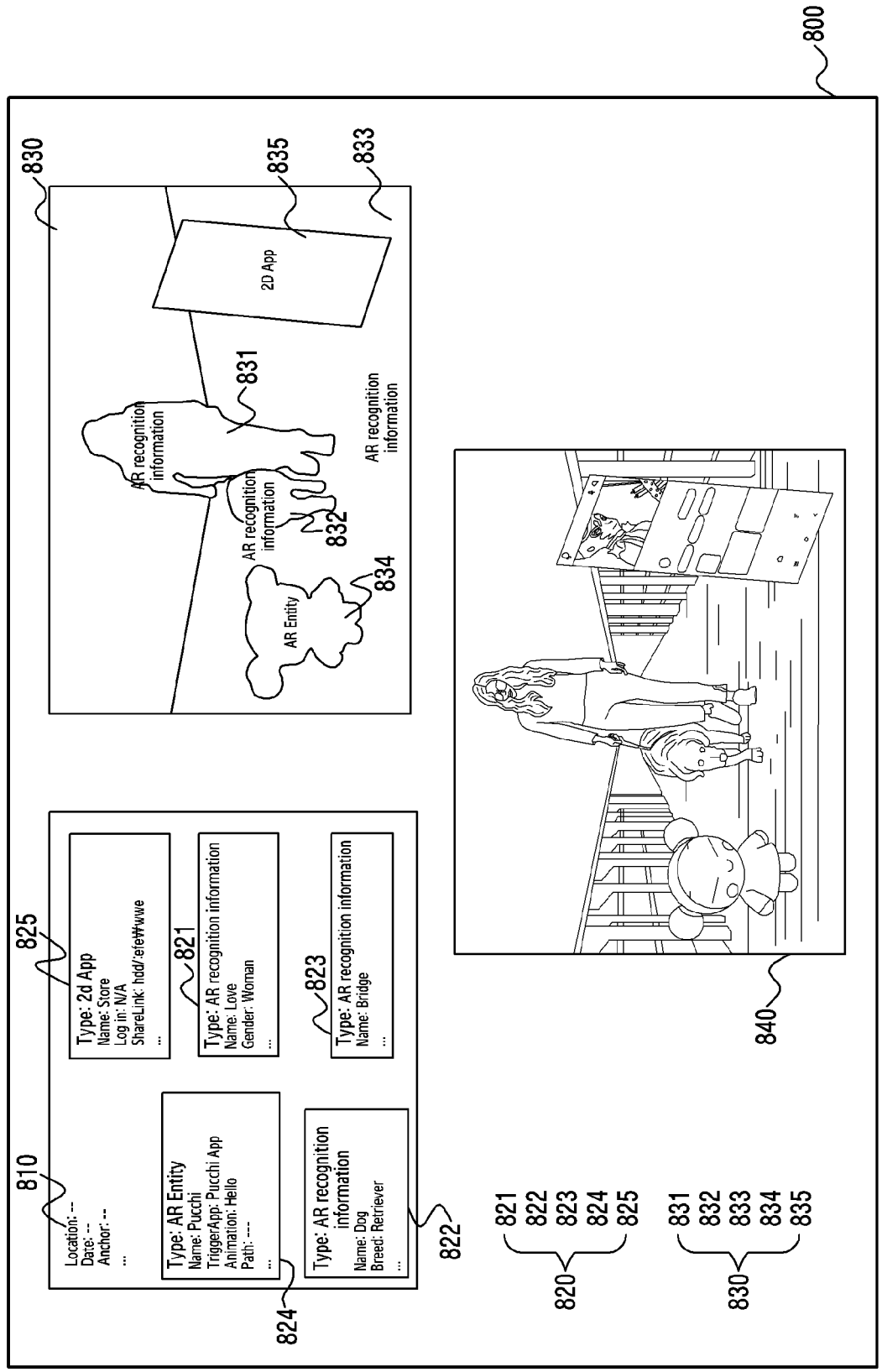
FIG. 8 is a diagram illustrating bookmarking data associated with an augmented reality scene according to an embodiment of the disclosure.

FIG. 8 is a diagram illustrating bookmarking data associated with an augmented reality scene according to an embodiment of the disclosure.

The description of bookmarking data 800 of FIG. 8 may make reference to bookmarking data 600 of FIG. 6. The descriptions of the electronic device 100 of FIG. 8 and the elements thereof may make reference to the electronic device 100 of FIGS. 1A, 1B, 2, 3, 4, 5, 6, and 7 and the elements thereof. The same terms or the same reference numerals are used for the elements that are the same or substantially the same as the above description, and duplicated description will be omitted.

Referring to FIG. 8, the bookmarking data 800 may include captured augmented reality scene-associated information 810, bookmarking object-associated information 820, segment information 830, and a capture image 840. The bookmarking object-associated information 820 may include first bookmarking object-associated information 821 to fifth bookmarking object-associated information 825. The bookmarking information may also include an AR Entity 824. However, the bookmarking data 800 is not limited thereto. For example, the bookmarking data 800 may omit at least one configuration among the above-described configurations, or may further include at least one configuration. The first segment information 830 may also include AR recognition information 831 and 832, an AR Entity 834 and a 2D App 835.

According to an embodiment, a user may search for a captured augmented reality scene. The user may search for a captured augmented reality scene using information included in bookmarking data. For example, the user may input a letter related to information included in bookmarking data as a search word or may input via voice, so as to search for bookmarking data including information related to the letter. However, the disclosure is not limited thereto.

More particularly, for example, an electronic device may receive, from a user, voice telling that "search for a scene of walking with a dog on a bridge a week ago". The electronic device may extract keywords including "week ago", "bridge", and "dog" from the voice. Based on the extracted keywords, the electronic device may display the augmented reality scene-associated information 810 including date information corresponding to the keyword "week ago", second bookmarking object-associated information 822 and third bookmarking object-associated information 823 corresponding to keywords "bridge" and "dog", and the associated capture image 840.

According to an embodiment, the processor 104 of the electronic device 100 may receive a user input to search for a captured augmented reality scene. The user input may include a user voice input or a user input for inputting a search word. However, the disclosure is not limited thereto. For example, the user input may be a gesture input defined in advance.

According to an embodiment, in response to the user input, the processor 104 may search for bookmarking data corresponding to the user input. For example, in the case that the user input is a user input for inputting a search word, the processor 104 may search for bookmarking data including the search word.

According to an embodiment, the processor 104 may control the display 101 so as to display at least one augmented reality scene corresponding to the retrieved bookmarking data. At least one augmented reality scene corresponding to the retrieved bookmarking data may be displayed in the form of an icon in the display 101. However, the disclosure is not limited thereto.

According to an embodiment, the electronic device (e.g., the electronic device 100 of FIGS. 1A and 1B) may include a microphone (not illustrated). The microphone may receive input of an external sound signal and may process as electric voice data. For example, the microphone may receive a sound signal from an external device or a speaker. The microphone may use various noise cancellation algorithms for cancelling noise produced in a process of receiving input of an external sound signal. The microphone may receive a user voice input for controlling the electronic device 100. According to an embodiment, the microphone may receive a voice input of a user who reads letters included in the bookmarking data 800.

According to an embodiment, the processor 104 may be operatively or electrically connected to the microphone. According to an embodiment, the processor 104 may extract at least one keyword from a user voice input. The processor 104 may search for the bookmarking data 800 including information corresponding to the at least one extracted keyword. For example, referring to FIG. 8, the bookmarking data 800 may include the second bookmarking object-associated information 822. The second bookmarking object-associated information 822 may include name information of 'puppy'. In this instance, for example, in response to a user voice input that tells "show me a bookmark associated with walking with a dog", the processor 104 may search for the bookmarking data 800 including second bookmarking object-associated information 822 including the name information of 'puppy'. The processor 104 may control the display 101 so as to display an augmented reality scene corresponding to the retrieved bookmarking data 800.

Figure 9:
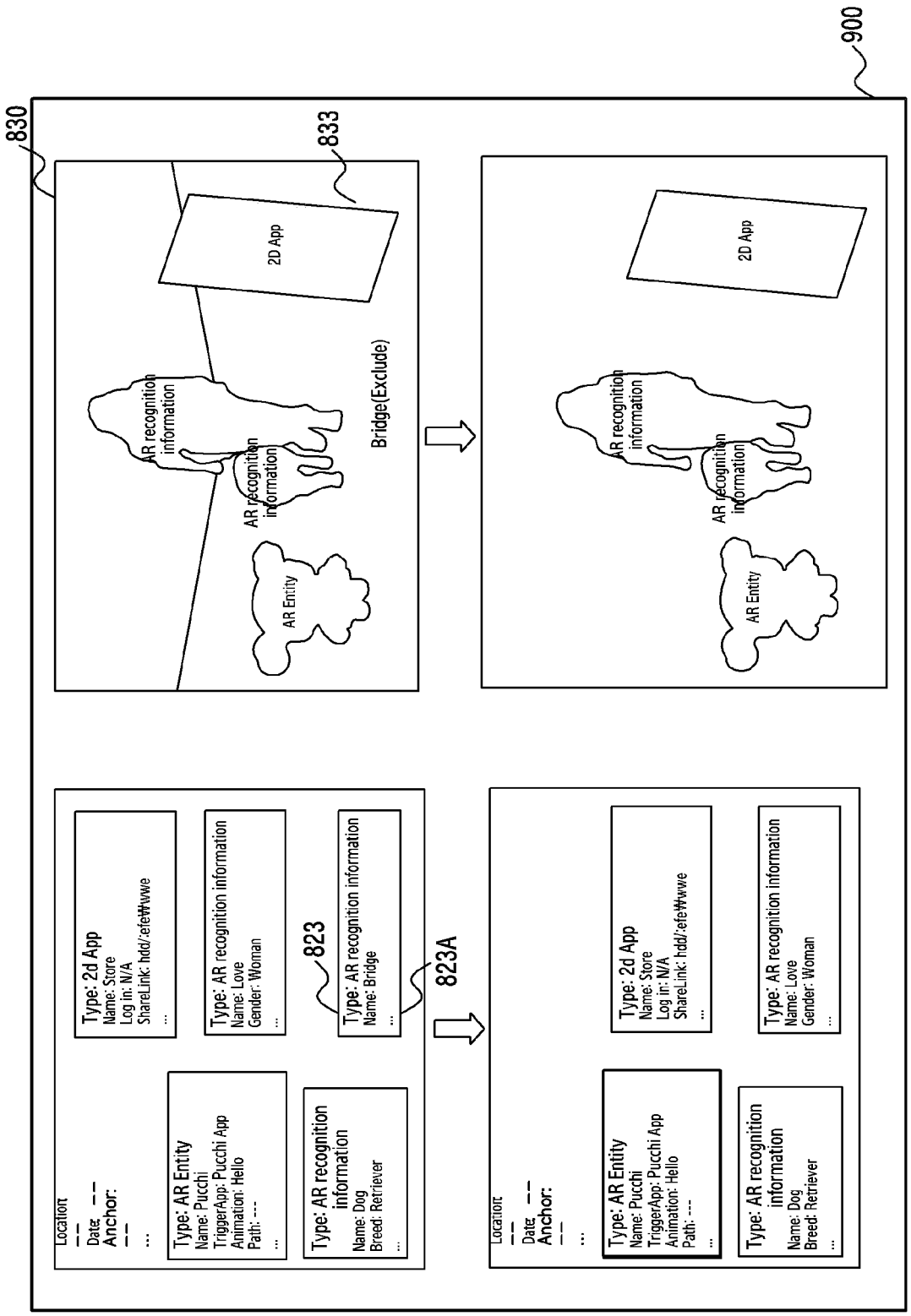
FIG. 9 is a diagram illustrating an example of excluding information associated with a bookmarking object according to an embodiment of the disclosure.

FIG. 9 is a diagram illustrating an example of excluding information associated with a bookmarking object according to an embodiment of the disclosure.

The description of bookmarking data 900 of FIG. 9 may make reference to bookmarking data 600 of FIG. 6 and bookmarking data 900 of FIG. 9. The descriptions of the electronic device 100 of FIG. 9 and the elements thereof may make reference to the electronic device 100 of FIGS. 1A, 1B, 2, 3, 4, 5, 6, 7, and 8 and the elements thereof. The same terms or the same reference numerals are used for the elements that are the same or substantially the same as the above description, and a duplicated description will be omitted.

According to an embodiment, the processor 104 of the electronic device 100 may segment an augmented reality scene into at least one area corresponding to at least one bookmarking object. For example, referring to FIG. 9, the first segment information 830 may segment an augmented reality scene into the first bookmarking object 821 of FIG. 8 to the fifth bookmarking object 825 of FIG. 8. The description of segment information may make reference to the description of FIG. 6.

According to an embodiment, the processor 104 may receive an additional user input for selecting an area among the at least one area. For example, referring to FIG. 9, the processor 104 may receive an additional user input for selecting a third area 833. According to an embodiment, the processor 104 may receive an additional user input for selecting a layer of a bookmarking object. According to an embodiment, an additional user input is a gesture input defined in advance, and for example, may be a user gesture input that draws a check or 'V' in an area selected by the user. Alternatively, a user input is a touch input, for example, a touch & hold input by a user that touches once or a plurality of times, or keeps touching at least a part of a layer of a bookmarking object (or a segmented area of a bookmarking object), at least a part of an internal area of the layer (or the area), or at least a part of the boundary of the layer, during a predetermined period of time. Alternatively, the user input may be a voice input defined in advance. However, the disclosure is not limited thereto.

According to an embodiment, in response to the additional user input, the processor 104 may exclude a bookmarking object corresponding to the selected area from the at least one bookmarking object. The processor 104 may exclude at least one bookmarking object in response to an additional user input, in the process in which bookmarking data is produced. However, the disclosure is not limited thereto. For example, the processor 104 may exclude at least one bookmarking object from the bookmarking data in response to an additional user input, in the state in which bookmarking data has been produced.

According to an embodiment, in the case that the processor 104 excludes at least one bookmarking object, the bookmarking data 900 may not include information related to a bookmarking object. For example, the bookmarking data 900 may not include the third bookmarking object-associated information 823 and segment information 830 associated with the third bookmarking object.

According to an embodiment, the processor 104 of the electronic device 100 may receive an additional user input that selects information among augmented reality scene-associated information or information associated with at least one bookmarking object. For example, referring to FIG. 9, the processor 104 may receive an additional user input for selecting name information 823A. According to an embodiment, an additional user input is a gesture input defined in advance, and for example, may be a user gesture input that draws a check or 'V' in an area selected by the user. Alternatively, a user input may be a touch input, for example, a touch & hold input that touches or keeps touching selected information during a predetermined period of time. Alternatively, the user input may be a voice input defined in advance. However, the disclosure is not limited thereto.

According to an embodiment, in response to the additional user input, the processor 104 may exclude information selected from among augmented reality scene-associated information or information associated with at least one bookmarking object. The processor 104 may exclude the selected information in response to the additional user input, in the process in which bookmarking data is produced. However, the disclosure is not limited thereto. For example, the processor 104 may exclude the selected information from the bookmarking data in response to an additional user input, in the state in which bookmarking data has been produced.

According to an embodiment, in the case that the processor 104 excludes the selected information, the bookmarking data 900 may not include at least one excluded information. For example, in the case that the name information 823A is excluded, the bookmarking data 900 may not include the name information 823A.

According to an embodiment, based on information included in the bookmarking data 900, the processor 104 of the electronic device 100 may obtain user preference information. For example, the processor 104 may obtain information preferred by a user in association with at least one of augmented reality scene-associated information, a bookmarking object, or bookmarking object-associated information. However, the disclosure is not limited thereto. For example, the processor 104 may obtain information preferred by a user based on the excluded bookmarking object, augmented reality scene-associated information, or bookmarking object-associated information.

According to an embodiment, the processor 104 may analyze information preferred by a user (or user preference) based on obtained user preference information. Based on analyzed information, the electronic device 100 may provide an additional service such as providing a list of bookmark priorities.

Figure 10:
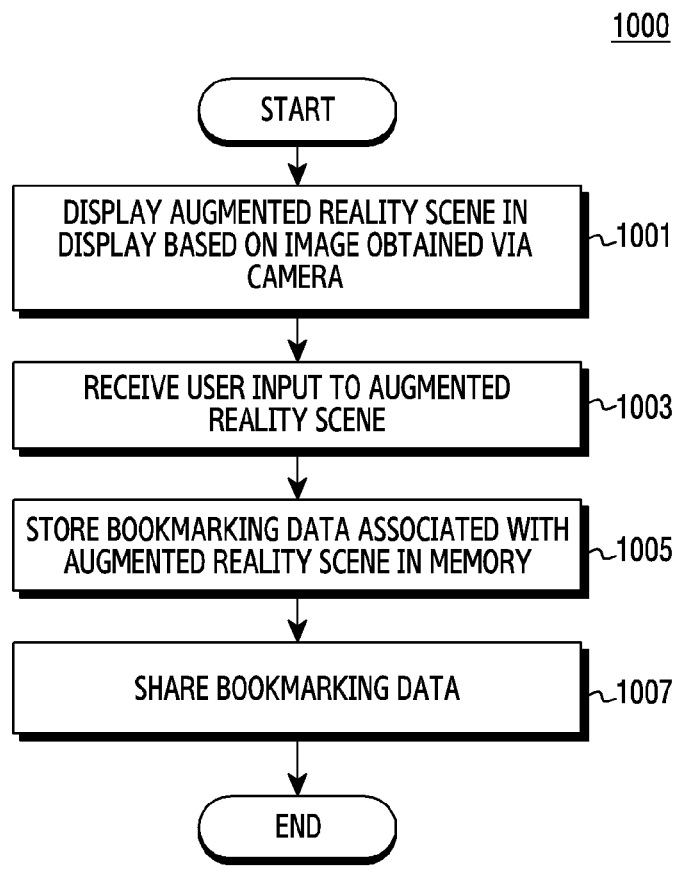
FIG. 10 is a flowchart illustrating an operation method of sharing bookmarking data according to an embodiment of the disclosure.

FIG. 10 is a flowchart illustrating an operation method of sharing bookmarking data according to an embodiment of the disclosure.

Figure 11:
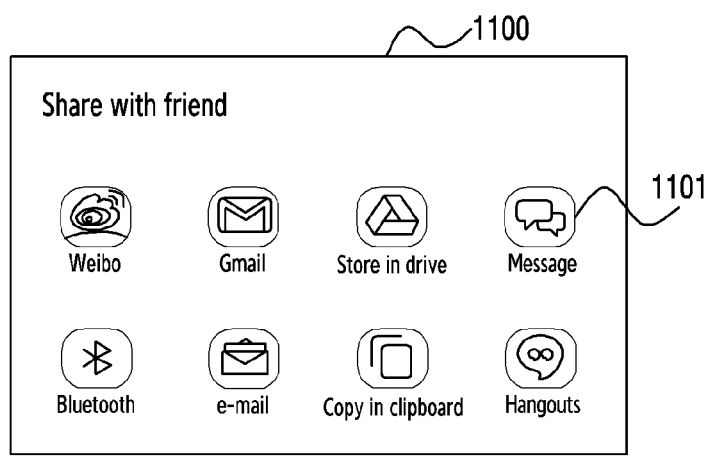
FIG. 11 is a diagram illustrating an example of a list of content sharing functions according to an embodiment of the disclosure.

FIG. 11 is a diagram illustrating an example of a list of content sharing functions according to an embodiment of the disclosure.

The operation method 1000 of FIG. 10 may be described with reference to the operation method 300 of FIG. 3, the operation method 500 of FIG. 5, and the operation method 700 of FIG. 7. For example, the descriptions of operation 310, operation 330, and operation 350 of FIG. 3 may make reference to operation 1001, operation 1003, and operation 1005 of FIG. 10, respectively. The descriptions of the electronic device 100 of FIGS. 10 and 11 and the elements thereof may make reference to the electronic device 100 of FIGS. 1A, 1B, 2, 3, 4, 5, 6, 7, 8, and 9 and the elements thereof. The same terms or the same reference numerals are used for the elements that are the same or substantially the same as the above description, and duplicated description will be omitted.

Referring to FIG. 10, the operation method 1000 of an electronic device according to an embodiment may further include an operation 1007 that performs sharing bookmarking data. According to an embodiment, in operation 1007, the processor 104 of the electronic device 100 may receive a user command to transmit bookmarking data stored in the memory 103 in operation 1005. According to an embodiment, the operation method 1000 of the electronic device may include operation 1007 that performs sharing bookmarking data, so that a user is capable of sharing bookmarking data or accessing bookmarking data using link information and/or page information included in a shared URI.

Referring to FIG. 11, the processor 104 may transmit bookmarking data to an application 1101 of FIG. 11. For example, in response to a user command to transmit bookmarking data to the application 1101, the processor 104 may control the display 101 to display a list of content sharing functions 1100 of FIG. 11 provided by the electronic device 100. According to an embodiment, the processor 104 may receive, as the user command, a user input that selects a sharing function that transmits the bookmarking data using at least one application 1101 in the list of content sharing functions. For example, referring to FIG. 11, the processor 104 may receive a user input that selects the message application 1101 as a user command to transmit bookmarking data via the message application 1101. However, the disclosure is not limited thereto.

According to an embodiment, the processor 104 may transmit bookmarking data to at least one external electronic device (not illustrated) or at least one server (not illustrated). For example, in response to a user command to transmit bookmarking data to at least one external electronic device or at least one server, the processor 104 may control the display 101 to display a list of external electronic devices or servers with which the bookmarking data is to be shared. According to an embodiment, the processor 104 may select at least one external electronic device or at least one server with which the bookmarking data is to be shared. The processor 104 may receive a user input for selecting the external electronic device or server as the user command. However, the disclosure is not limited thereto.

According to an embodiment, in the case that application execution screen-associated information is included in bookmarking data, the processor 104 may store URL information of the application execution screen in the memory 103. According to an embodiment, the processor 104 may store, in the memory 103, a code for sharing the URL information of the application execution screen of when the bookmarking data was stored (or when an augmented reality scene was captured). According to an embodiment, the bookmarking data may include a code for sharing the URL information of the application execution screen. Therefore, in the case that the processor 104 controls the display 101 to display an augmented reality scene corresponding to stored bookmarking data, the display 101 may display the URL webpage of an application execution screen of when the bookmarking data was stored (or when the augmented reality scene was captured).

According to an embodiment, the electronic device 100 may use a function of sharing an application framework (application framework) of Android in order to share bookmarking data. For example, using Android Sharesheet of a content provider included in the application framework, the electronic device 100 may transmit the link of an application execution screen included in the bookmarking data to at least one among at least one other application, at least one external device, or at least one server. However, the disclosure is not limited thereto.

Figure 12:
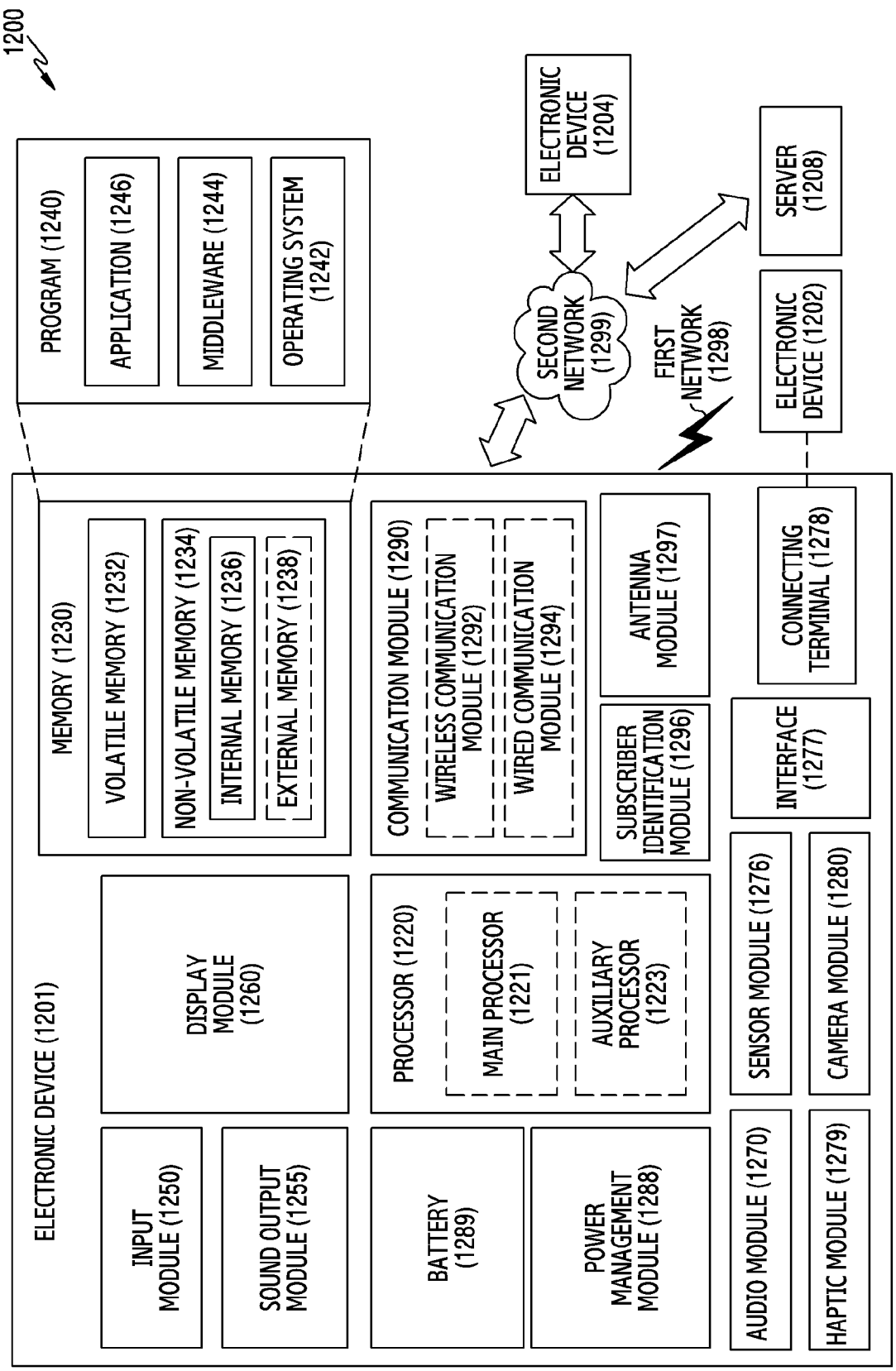
FIG. 12 is a block diagram illustrating an electronic device in a network environment according to an embodiment of the disclosure.

FIG. 12 is a block diagram of an electronic device in a network environment according to an embodiment of the disclosure.

The electronic device 1201 of FIG. 12 may be described with reference to the electronic device 100 of FIGS. 1A, 1B, 2, 3, 4, 5, 6, 7, 8, 9, 10, and 11.

Referring to FIG. 12, an electronic device 1201 in a network environment 1200 may communicate with an electronic device 1202 via a first network 1298 (e.g., a short-range wireless communication network), or at least one of an external electronic device 1204 or a server 1208 via a second network 1299 (e.g., a long-range wireless communication network). According to an embodiment, the electronic device 1201 may communicate with the electronic device 1204 via the server 1208. According to an embodiment, the external electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled with the processor 1220, and may perform various data processing or computation. According to one embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to one embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the external electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the external electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled with the second network 1299. Each of the external electronic devices 1202 or 1204 may be a device of a same type as, or a different type, from the electronic device 1201. According to an embodiment, all or some of operations to be executed at the electronic device 1201 may be executed at one or more of the external electronic devices 1202 or 1204, or the server 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device according to an embodiment may include a display, a camera, a memory, and at least one processor operatively connected to the display, the camera, and the memory, and the at least one processor may be configured to display, in the display, an augmented reality scene including at least one bookmarking object based on an image obtained via the camera, to receive a user input to the augmented reality scene, and in response to the user input, to store, in the memory, bookmarking data including at least one of information associated with the augmented reality scene or information associated with the at least one bookmarking object.

According to an embodiment, the at least one bookmarking object may include at least one of a subject image recognized in the image obtained via the camera or a virtual image displayed by being included in the augmented reality scene, and the virtual image may include at least one of a virtual object or an application execution screen.

According to an embodiment, the processor may be configured to determine, based on the user input, a capture area including the at least one bookmarking object from the augmented reality scene, and based on the determined capture area, to determine the at least one bookmarking object included in the bookmarking data.

According to an embodiment, the processor may be configured to determine at least one of the location and the line of sight of a user of the electronic device, and to determine the augmented reality scene based on at least one of the location and the line of sight.

According to an embodiment, the processor may be configured to segment the augmented reality scene into at least one area corresponding to the at least one bookmarking object, to receive an additional user input for selecting an area among the at least one area, and in response to the additional user input, to exclude a bookmarking object corresponding to the selected area from the at least one bookmarking object.

According to an embodiment, the processor may be configured to receive an additional user input for selecting information among information associated with the augmented reality scene or information associated with the at least one bookmarking object, and in response to the additional user input, to exclude selected information from the information associated with the at least one bookmarking object.

According to an embodiment, the processor may be configured to obtain, based on the information included in the bookmarking data, preference information associated with at least one of the bookmarking object or the information associated with the bookmarking object.

According to an embodiment, the processor may be configured to receive a user input to information included in the bookmarking data, and to control the display to display the bookmarking data in response to the user input to the information included in the bookmarking data.

According to an embodiment, the processor may be configured to receive a user input for searching for a captured augmented reality scene, to search for bookmarking data corresponding to the user input in response to the user input, and to control the display so as to display an augmented reality scene corresponding to the retrieved bookmarking data.

According to an embodiment, the user input may include a voice input, and the processor may be configured to extract at least one keyword from the voice input, and to search for bookmarking data including information corresponding to the at least one extracted keyword.

According to an embodiment, the processor may be configured to receive a user command to transmit the bookmarking data, in response to the user command to transmit the bookmaking data, to control the display to display a list of content sharing functions provided by the electronic device, and to receive, as the user command, a user input for selecting a sharing function that transmits the bookmarking data using at least one application in the list of content sharing functions.

According to an embodiment, the bookmarking data may include basic information including type information that classifies the bookmarking object, type-based information configured based on the type information, augmented reality segment information indicating an area of the bookmarking object in the augmented reality scene, and an image obtained by capturing the augmented reality scene.

According to an embodiment, the basic information may include at least one among location information, time information, or anchor information associated with the augmented reality scene.

According to an embodiment, in the case that the type information indicates that the bookmarking object is a virtual object that overlaps the image, the type-based information may include trigger information associated with a trigger that calls the virtual object or call information for calling the virtual object, and in the case that the type information is an application execution screen, the type-based information may include state information of an application for executing the application execution screen.

As described above, an operation method of an electronic device according to an embodiment may include, based on an image obtained via a camera, an operation of displaying, in a display, an augmented reality scene including at least one bookmarking object, an operation of receiving a user input to the augmented reality scene, and in response to the user input, an operation of storing, in a memory, bookmarking data including at least one of information associated with the augmented reality scene or information associated with the at least one bookmarking object.

According to an embodiment, the operation method of the electronic device may include an operation of determining, based on the user input, a capture area including the at least one bookmarking object in the augmented reality scene, and an operation of determining, based on the determined capture area, the at least one bookmarking object included in the bookmarking data.

According to an embodiment, the operation method of the electronic device may include an operation of segmenting the augmented reality scene into at least one area corresponding to the at least one bookmarking object, an operation of receiving an additional user input for selecting an area among the at least one area, and, in response to the additional user input, an operation of excluding, from the bookmarking data, a bookmarking object corresponding to the selected area among the at least one bookmarking object.

According to an embodiment, the operation method of the electronic device may include an operation of receiving a user input for searching for a captured augmented reality scene, an operation of searching for bookmarking data corresponding to the user input in response to the user input, and an operation of controlling the display so as to display an augmented reality scene corresponding to the retrieved bookmarking data.

According to an embodiment, the operation of searching for the bookmarking data may further include an operation of extracting at least one keyword from a voice input of a user, and an operation of searching for bookmarking data including information corresponding to the at least one extracted keyword.

According to an embodiment, the operation method of the electronic device may include an operation of receiving a user command to transmit the bookmarking data, an operation of controlling the display so as to display a list of content sharing functions provided by the electronic device, in response to the user command to transmit the bookmarking data, and an operation of receiving, as the user command, a user input for selecting a sharing function that transmits the bookmarking data using at least one application in the list of content sharing functions.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a camera;
memory storing one or more computer programs; and
one or more processors communicatively coupled to the display, the camera, and the memory,
wherein the one or more computer programs include computer-executable instructions that, when executed by the one or more processors individually or collectively, cause the electronic device to:
display, in the display, an augmented reality scene comprising at least one bookmarking object based on an image obtained via the camera,
receive a first user input for capturing at least a portion of the augmented reality scene,
in response to capturing the at least a portion of the augmented reality scene based on the first user input, store, in the memory, bookmarking data comprising a subject image, information associated with the subject image, a virtual image, and information associated with the virtual image,
receive a second user input for searching for a captured augmented reality scene generated by capturing the at least a portion of the augmented reality scene, the second user input comprising a voice input,
extract at least one keyword from the voice input, and
search for bookmarking data comprising information corresponding to the at least one extracted keyword.

2. The electronic device of claim 1,
wherein the at least one bookmarking object comprises at least one of a subject image recognized in the image obtained via the camera or a virtual image displayed by being included in the augmented reality scene, and
wherein the virtual image comprises at least one of a virtual object or an application execution screen.

3. The electronic device of claim 1, wherein the one or more computer programs further include computer-executable instructions that, when executed by the one or more processors individually or collectively, cause the electronic device to:
determine, based on the first user input, a capture area comprising the at least one bookmarking object from the augmented reality scene, and
based on the determined capture area, determine the at least one bookmarking object included in the bookmarking data.

4. The electronic device of claim 1, wherein the one or more computer programs further include computer-executable instructions that, when executed by the one or more processors individually or collectively, cause the electronic device to:
determine at least one of a location and a line of sight of a user of the electronic device, and
determine the augmented reality scene based on at least one of the location and the line of sight.

5. The electronic device of claim 1, wherein the one or more computer programs further include computer-executable instructions that, when executed by the one or more processors individually or collectively, cause the electronic device to:
segment the augmented reality scene into at least one area corresponding to the at least one bookmarking object,
receive an additional user input for selecting an area among the at least one area; and
in response to the additional user input, exclude a bookmarking object corresponding to the selected area from the at least one bookmarking object.

6. The electronic device of claim 1, wherein the one or more computer programs further include computer-executable instructions that, when executed by the one or more processors individually or collectively, cause the electronic device to:
receive an additional user input for selecting information among information associated with the augmented reality scene or information associated with the at least one bookmarking object, and
in response to the additional user input, exclude information selected from among the information associated with the augmented reality scene or the information associated with the at least one bookmarking object.

7. The electronic device of claim 1, wherein the one or more computer programs further include computer-executable instructions that, when executed by the one or more processors individually or collectively, cause the electronic device to obtain, based on the information included in the bookmarking data, preference information associated with at least one of the bookmarking object or the information associated with the bookmarking object.

8. The electronic device of claim 1, wherein the one or more computer programs further include computer-executable instructions that, when executed by the one or more processors individually or collectively, cause the electronic device to:
receive a third user input to information included in the bookmarking data, and
control the display so as to display the bookmarking data in response to the third user input to the information included in the bookmarking data.

9. The electronic device of claim 1, wherein the one or more computer programs further include computer-executable instructions that, when executed by the one or more processors individually or collectively, cause the electronic device to:
retrieve bookmarking data corresponding to the second user input for searching for the captured augmented reality scene in response to the second user input for searching for the captured augmented reality scene, and
control the display so as to display an augmented reality scene corresponding to the retrieved bookmarking data.

10. The electronic device of claim 1, wherein the one or more computer programs further include computer-executable instructions that, when executed by the one or more processors individually or collectively, cause the electronic device to:
receive a user command to transmit the bookmarking data,
in response to the user command to transmit the bookmarking data, control the display so as to display a list of content sharing functions provided by the electronic device, and
receive, as the user command, a third user input for selecting a sharing function that transmits the bookmarking data using at least one application in the list of content sharing functions.

11. The electronic device of claim 1, wherein the bookmarking data comprises basic information comprising type information that classifies the bookmarking object, type-based information configured based on the type information, augmented reality segment information indicating an area of the bookmarking object in the augmented reality scene, and an image obtained by capturing the augmented reality scene.

12. The electronic device of claim 11, wherein the basic information comprises at least one among location information, time information, or anchor information associated with the augmented reality scene.

13. The electronic device of claim 11,
wherein, in a case that the type information indicates that the bookmarking object is a virtual object that overlaps the image, the type-based information comprises trigger information associated with a trigger that calls the virtual object or call information for calling the virtual object, and wherein, in a case that the type information is an application execution screen, the type-based information comprises state information of an application for executing the application execution screen.

14. A method performed by an electronic device, the method comprising:
based on an image obtained via a camera, displaying, by the electronic device in a display, an augmented reality scene comprising at least one bookmarking object;
receiving, by the electronic device, a first user input for capturing at least a portion of the augmented reality scene;
in response to capturing the at least a portion of the augmented reality scene based on the first user input, storing, by the electronic device in a memory, bookmarking data comprising a subject image, information associated with the subject image, a virtual image, and information associated with the virtual image,
receiving a second user input for searching for a captured augmented reality scene generated by capturing the at least a portion of the augmented reality scene, the second user input comprising a voice input;
extracting at least one keyword from the voice input; and
searching for bookmarking data comprising information corresponding to the at least one extracted keyword.

15. The method of claim 14, further comprising:
determining, based on the first user input, a capture area comprising the at least one bookmarking object in the augmented reality scene; and
determining, based on the determined capture area, the at least one bookmarking object included in the bookmarking data.

16. The method of claim 14, further comprising:
segmenting the augmented reality scene into at least one area corresponding to the at least one bookmarking object;
receiving an third user input for selecting an area among the at least one area; and
in response to the third user input, excluding, from the bookmarking data, a bookmarking object corresponding to the selected area among the at least one bookmarking object.

17. The method of claim 14, further comprising:
retrieving bookmarking data corresponding to the second user input for searching for the captured augmented reality scene in response to the user second input for searching for the captured augmented reality scene; and
controlling the display so as to display an augmented reality scene corresponding to the retrieved bookmarking data.

18. The method of claim 14, further comprising:
receiving a user command to transmit the bookmarking data;
controlling the display so as to display a list of content sharing functions provided by the electronic device, in response to the user command to transmit the bookmarking data; and
receiving, as the user command, a third user input for selecting a sharing function that transmits the bookmarking data using at least one application in the list of content sharing functions.

* * * * *